United States Patent
Li

(10) Patent No.: US 10,572,083 B2
(45) Date of Patent: Feb. 25, 2020

(54) FLEXIBLE DISPLAY SCREEN SYSTEM

(71) Applicant: SHENZHEN ROYOLE TECHNOLOGIES CO., LTD., Shenzhen (CN)

(72) Inventor: Jinxin Li, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/738,616

(22) PCT Filed: Dec. 25, 2015

(86) PCT No.: PCT/CN2015/099011
§ 371 (c)(1),
(2) Date: Dec. 21, 2017

(87) PCT Pub. No.: WO2017/107204
PCT Pub. Date: Jun. 29, 2017

(65) Prior Publication Data
US 2018/0181233 A1  Jun. 28, 2018

(51) Int. Cl.
*G06F 3/044* (2006.01)
*G06F 3/0484* (2013.01)
(Continued)

(52) U.S. Cl.
CPC .............. *G06F 3/044* (2013.01); *G06F 3/041* (2013.01); *G06F 3/0484* (2013.01); *G09G 3/20* (2013.01);
(Continued)

(58) Field of Classification Search
CPC .. G06F 3/044; G06F 3/01; G06F 2203/04102; G06F 1/1652;
(Continued)

(56) References Cited

U.S. PATENT DOCUMENTS

2002/0109662 A1* 8/2002 Miller ................... G06F 1/1616
345/100
2010/0060548 A1* 3/2010 Choi ..................... G06F 3/0414
345/1.3
(Continued)

FOREIGN PATENT DOCUMENTS

CN 101674361 A 3/2010
CN 101739171 A 6/2010
(Continued)

OTHER PUBLICATIONS

International Search Report issued in PCT/CN2015/099011, dated Sep. 2, 2016 (8 pages).

*Primary Examiner* — Temesghen Ghebretinsae
*Assistant Examiner* — Ivelisse Martinez Quiles
(74) *Attorney, Agent, or Firm* — IPro, PLLC; Na Xu

(57) ABSTRACT

A flexible display screen system having a flexible display screen, a sensor and a control module, in which the flexible display screen is formed with a first display region, the sensor is configured to generate a bending signal when the flexible display screen is bent, and the control module is configured to control the flexible display screen (10) to form a second display region according to the bending signal and the display content of the first display region and control the second display region to display the display content. The flexible display screen system realizes control over the flexible display screen by bending, and may form another display area which facilitates sharing the content of the original display area with others, and is easy and convenient to operate.

11 Claims, 5 Drawing Sheets

(51) Int. Cl.
*G06F 3/041* (2006.01)
*G09G 3/20* (2006.01)

(52) U.S. Cl.
CPC .............. *G06F 2203/04102* (2013.01); *G06F 2203/04803* (2013.01); *G09G 2354/00* (2013.01)

(58) Field of Classification Search
CPC ......... G06F 2203/04803; G06F 1/1618; G06F 3/0484; G06F 3/041; G09G 3/20; G09G 2354/00; G09G 2380/02; H04M 1/0268; G02F 1/133305; G09F 9/301; H01L 2251/5338
See application file for complete search history.

(56) References Cited

U.S. PATENT DOCUMENTS

| | | | | |
|---|---|---|---|---|
| 2012/0235894 | A1* | 9/2012 | Phillips | G09G 3/36 345/156 |
| 2013/0120239 | A1* | 5/2013 | Suzuki | G06F 1/1643 345/156 |
| 2013/0215011 | A1* | 8/2013 | Ke | G06F 3/03 345/156 |
| 2013/0215041 | A1* | 8/2013 | Kim | G06F 3/0487 345/173 |
| 2014/0054438 | A1* | 2/2014 | Yun | G06F 1/1652 248/550 |
| 2014/0098095 | A1* | 4/2014 | Lee | G06F 3/041 345/420 |
| 2014/0139447 | A1* | 5/2014 | Kang | G06F 3/044 345/173 |
| 2014/0380227 | A1* | 12/2014 | Ng | G06F 1/1616 715/778 |
| 2015/0116608 | A1* | 4/2015 | Jeong | G06F 1/1652 349/12 |
| 2015/0130738 | A1* | 5/2015 | Park | G06F 3/1446 345/173 |
| 2015/0169091 | A1* | 6/2015 | Ho | G06F 3/0416 345/173 |
| 2015/0185911 | A1* | 7/2015 | Kim | G06F 3/044 349/12 |
| 2015/0301636 | A1* | 10/2015 | Akimoto | G06F 3/044 345/173 |
| 2016/0098063 | A1* | 4/2016 | Lee | G06F 1/1641 345/659 |
| 2016/0098132 | A1* | 4/2016 | Kim | G06F 3/0416 345/173 |
| 2018/0198896 | A1* | 7/2018 | Kang | H04M 1/02 |

FOREIGN PATENT DOCUMENTS

| | | |
|---|---|---|
| CN | 103258491 A | 8/2013 |
| CN | 104520788 A | 4/2015 |
| CN | 104571747 A | 4/2015 |
| CN | 204406917 U | 6/2015 |

* cited by examiner

FLEXIBLE DISPLAY SCREEN SYSTEM

FIELD

The present disclosure relates to the field of a display screen, and more particularly to a flexible display screen system.

BACKGROUND

At present, smart terminal products, such as mobile phones or tablet PCs, are becoming more and more popular due to their conveniences of various aspects.

People usually sit face-to-face for the vast majority of occasions such as eating, chatting, and meetings. When someone wants to show a picture or other information contents on a screen of a terminal to another person, he needs to turn a device over so as to let the screen facing to the other person or directly hand the screen of the terminal to the other person, and get the terminal back until the other person finished watching. In this way, a transfer of the terminal among different people may cause time wasting and interaction difficulties to a certain extent, thus resulting in bad user experience.

With technical development of a flexible display screen, the flexible display screen is gradually used in a variety of electronic devices. Therefore, an urgent problem to be solved is how to use the flexible display screen to achieve convenience of a display operation.

SUMMARY

The present disclosure seeks to solve at least one of the problems that exist in the related art to at least some extent. Accordingly, embodiments of the present disclosure provide a flexible display screen system including:

a flexible display screen formed with a first display region;

a sensor configured to generate a bending signal when the flexible display screen is bent; and a control module connected with the flexible display screen and the sensor, in which the control module is configured to control the flexible display screen to form a second display region according to the bending signal and a display content of the first display region and to control the second display region to display the display content of the first display region.

In some embodiments, the flexible display screen includes a first display surface and a second display surface opposite to each other, the first display region is formed on the first display surface, and the second display region is formed on the second display surface.

In some embodiments, the sensor is configured to generate a restoring signal when the flexible display screen is recovered to a flat state, and the control module is configured to cancel the second display region according to the restoring signal.

In some embodiments, the sensor is configured to generate the bending signal when the flexible display screen is bent in a first direction, and to generate the restoring signal when the flexible display screen is bent in a second direction opposite to the first direction; and the control module is configured to cancel the second display region according to the restoring signal.

In some embodiments, the sensor includes a first capacitor and a second capacitor, a capacitance of the first capacitor is changed when the flexible display screen is bent in the first direction, a capacitance of the second capacitor is changed when the flexible display is bent in the second direction;

the sensor is configured to generate the bending signal when a change in the capacitance of the first capacitor reaches a first preset capacitance, and to generate the restoring signal when a change in the capacitance of the second capacitor reaches a second preset capacitance.

In some embodiments, the flexible display screen includes an isolation layer, the first capacitor and the second capacitor are disposed at two opposite sides of the isolation layer respectively, and the isolation layer is configured to isolate the first capacitor from the second capacitor so as to prevent the capacitance of the first capacitor and the capacitance of the second capacitor from changing synchronously when the flexible display screen is bent or recovered.

In some embodiments, the control module is configured to control the first display region and the second display region to simultaneously display the same content.

In some embodiments, the flexible display screen includes the flexible display screen includes a display surface; the first display region and the second display region are formed on the display surface;

the control module is configured to control the first display region to form at least two of the second display regions according to the bending signal.

In some embodiments, the sensor is configured to generate a restoring signal when the flexible display screen is recovered to a flat state; and the control module is configured to cancel the second display region and recover the first display region according to the restoring signal and control the first display region to display the display content.

In some embodiments, the sensor is configured to generate the bending signal when the flexible display screen is bent in a first direction, and configured to generate a restoring signal when the flexible display screen is bent in a second direction opposite to the first direction;

the control module is configured to cancel the second display region and recover the first display region according to the restoring signal and control the first display region to display the display content of the second display region.

In some embodiments, the sensor includes a first capacitor and a second capacitor, a capacitance of the first capacitor is changed when the flexible display screen is bent in the first direction, a capacitance of the second capacitor is changed when the flexible display is bent in the second direction;

the sensor is configured to generate the bending signal when a change in the capacitance of the first capacitor reaches a first preset capacitance, and to generate the restoring signal when a change in the capacitance of the second capacitor reaches a second preset capacitance.

In some embodiments, the flexible display screen includes an isolation layer, the first capacitor and the second capacitor are disposed at two opposite sides of the isolation layer respectively, and the isolation layer is configured to isolate the first capacitor from the second capacitor so as to prevent the capacitance of the first capacitor and the capacitance of the second capacitor from changing synchronously when the flexible display screen is bent or recovered.

In some embodiments, the control module is configured to control at least two of the second display regions to simultaneously display the same content.

In some embodiments, the flexible display screen is a flexible touch screen configured to receive an input signal from the flexible touch screen.

BRIEF DESCRIPTION OF THE DRAWINGS

These and other aspects and advantages of embodiments of the present disclosure will become apparent and more

DETAILED DESCRIPTION

Figure 1:
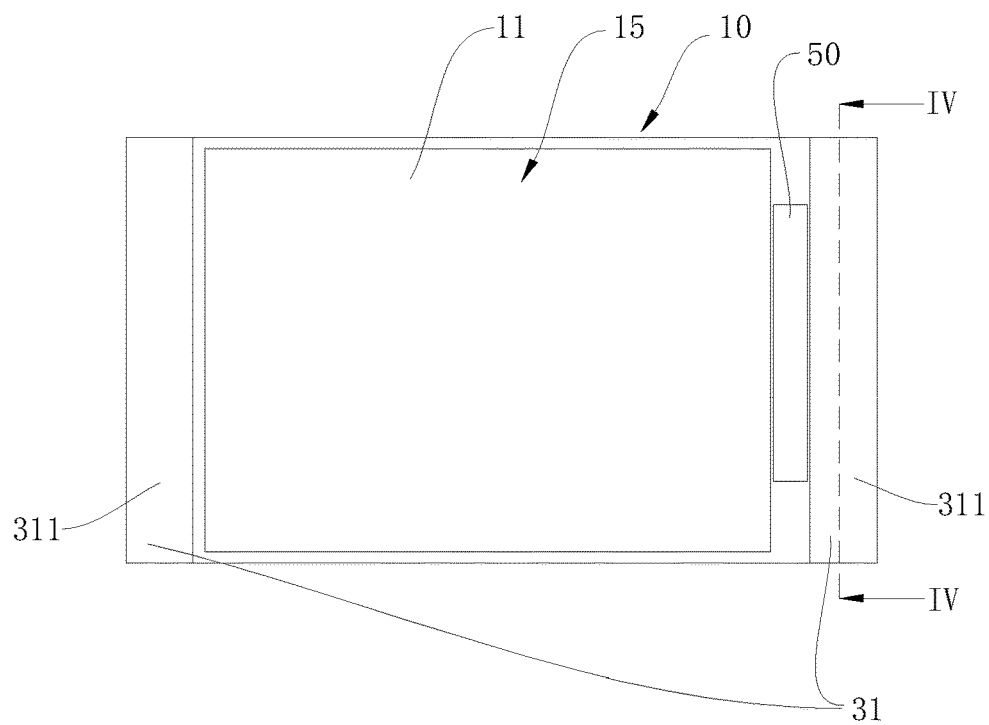
FIG. 1 is a plan schematic view of a flexible display screen system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the description of the present disclosure, it should be understood that, unless specified or limited otherwise, the terms "mounted", "connected", "coupled" and "fixed" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only illustrated as examples and should not be constructed to limit the present disclosure. In addition, reference numerals may be repeated in different examples in the present disclosure. This repeating is for the purpose of simplification and clarity and does not refer to relations among different embodiments and/or settings. Furthermore, examples of different processes and materials are provided in the present disclosure. However, it would be appreciated by those skilled in the art that other processes and/or materials may be also applied.

Figure 2:
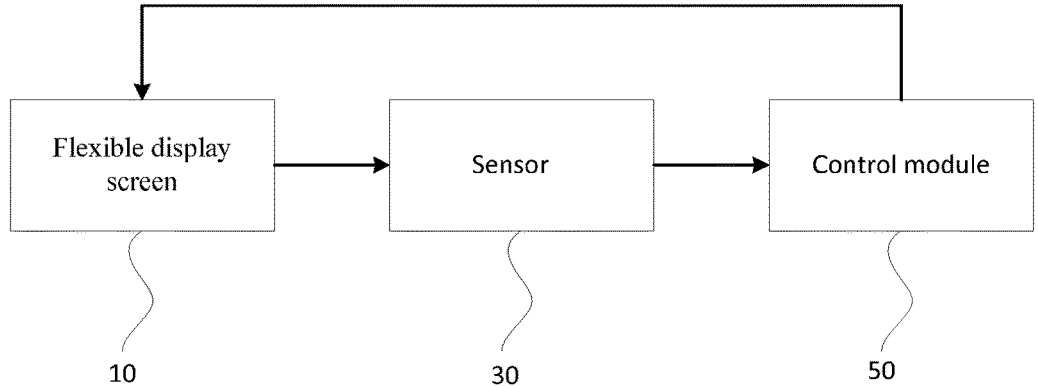
FIG. 2 is a schematic diagram of functional modules in a flexible display screen system according to an embodiment of the present disclosure.
Figure 3:
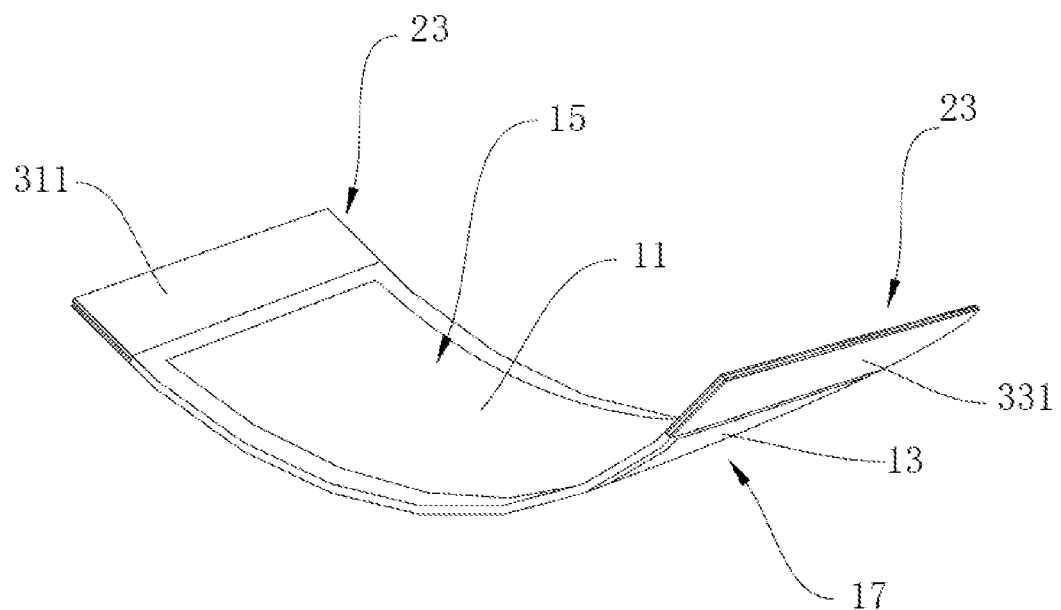
FIG. 3 is a three-dimensional view of the flexible display screen system of FIG. 1.

Referring to FIGS. 1-3, a flexible display screen system 100 according to an embodiment of the present disclosure includes a flexible display screen 10, a sensor 30, and a control module 50.

The flexible display screen 10 is formed with a first display region 11. The sensor 30 is configured to generate a bending signal when the flexible display screen 10 is bent. The control module 50 is connected with the flexible display screen 10 and the sensor 30. The control module 50 is configured to control the flexible display screen 10 to form a second display region 13 according to the bending signal and a display content of the first display region 11 and to control the second display region 13 to display the display content of the first display region 11.

With the flexible display screen system 100 described above, a display control of the flexible display screen 10 may be realized by bending the screen, and another display region may be formed so as to provide the content of the original display region to be shared to other people. Moreover, the operation is easy and the experience of the user is ensured to be improved.

The flexible display screen 10 is a flexible and bendable display device. For example, the flexible display screen 10 can be manufactured by a phosphorescent organic light-emitting diode (PHOLED) technology. The manufactured flexible display screen 10 has features of low power consumption, bendability and direct visualization.

In an embodiment, the display region can be understood as a display screen region where the information is displayed in a working state of the flexible display screen 10. The flexible display screen 10 has only one first display region 11 in a normal working state. In some cases, if a user wants to share content of the screen to another person in a face-to-face conversation, the user may realize activating the second display region 13 by bending the flexible display screen 10, so as to allow the opposite person to see the display content.

When the second display region 13 is activated to display, the control module 50 may control the first display region 11 to be closed so as to complete switch of the display regions, thus saving electric energy. The control module 50 may also control the first display region 11 to be maintained in a display state, so that different display regions may be watched at different angles. In an embodiment of the present disclosure, the control module 50 controls the first display region 11 and the second display region 13 to simultaneously display the same content.

Referring to FIG. 3, in an embodiment, the flexible display screen 10 includes a first display surface 15 and a second display surface 17 opposite to each other. The first display region 11 is formed on the first display surface 15 and the second display region 13 is formed on the second display surface 17.

Specifically, in an embodiment, the flexible display screen 10 is a double-sided display screen. Under normal circumstances, the first display surface 15 is a front display surface facing to a user when the flexible display screen 10 is used, and the second display surface 17 is a back display surface. However, in flexible display screens 10 of the other embodiments, the first display surface 15 may be the back display surface, and the second display surface 17 may be the front display surface, such an arrangement may be defined according to a common or conventional display surface used by the user.

Therefore, in an embodiment, when two people sit in a face to face manner, the user holding the flexible display screen 10 may allow the opposite person to directly see the content to be displayed by simply bending the flexible display screen 10.

Referring to FIGS. 1-3, in an embodiment, the sensor 30 is configured to generate the bending signal when the flexible display screen 10 is bent in a first direction, and to generate the restoring signal when the flexible display screen 10 is bent in a second direction opposite to the first direction. The control module 50 is configured to cancel the second display region according to the restoring signal.

Specifically, in the example shown in FIG. 3, the expression "the flexible display screen 10 is bent in a first direction" may be described for understanding as that the left and right ends 23 of the flexible display screen 10 are moved in a direction of the first display surface 15 and close to the middle of the flexible display screen 10. Correspondingly, the expression "the flexible display screen 10 is bent in a second direction" may be described for understanding as that the left and right ends 23 of the flexible display screen 10 are moved in a direction of the second display surface 17 and close to the middle of the flexible display screen 10.

In an embodiment, an operation is distinguished from others by bending the flexible display screen 10 in different directions. When the flexible display screen 10 is bent in the first direction, the second display region 13 is generated to be displayed to the opposite person. When the flexible display screen 10 is bent in the second direction, the second display region 13 is canceled. That is, the restoring signal is not generated when the flexible display screen 10 is restored from the bending state formed in the first direction to the flat state, and the restoring signal may be generated when the flexible display screen 10 is bent in the second direction so as to cancel the second display region 13.

The advantage of this embodiment is that, display of the second display region 13 may be maintained even when the flexible display screen 10 is restored to be in the flat state. If the content displayed by the second display region 13 is a video that needs to be played for a long time, such an advantage may make the control manner more convenient and humanized, thus avoiding operation errors.

Figure 4:
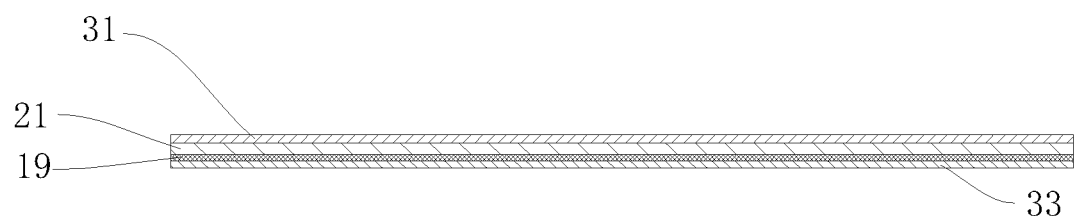
FIG. 4 is a sectional view of the flexible display screen system of FIG. 1 in a direction of line IV-IV.

Referring to FIG. 4, in order to implement the above control manner, in an embodiment, the sensor 30 includes a first capacitor 31 and a second capacitor 33. A capacitance of the first capacitor 31 is changed when the flexible display screen 10 is bent in the first direction, and a capacitance of the second capacitor 33 is changed when the flexible display 10 is bent in the second direction. The sensor 30 is configured to generate the bending signal when a change in the capacitance of the first capacitor 31 reaches a first preset capacitance, and to generate the restoring signal when a change in the capacitance of the second capacitor 33 reaches a second preset capacitance.

The first capacitor 31 and the second capacitor 33 are set for determining a direction for bending the flexible display screen 10, and the display control may be triggered when the flexible display screen 10 is bent to a certain extent according to preset capacitances, thus avoiding operation errors.

In an embodiment, two first electrodes 311 of the first capacitor 31 are disposed on two ends 23 of the first display surface 15 respectively, and two second electrodes 331 of the second capacitor 33 are disposed on two ends 23 of the second display surface 17 respectively. More specifically, one of the first electrodes 311 may be a positive electrode, and the other of the first electrodes 311 may be a negative electrode, which are disposed at two ends 23 of the first display surface 15 respectively. One of the second electrodes 331 may be a positive electrode, and the other of the second electrodes 331 may be a negative electrode, which are disposed at two ends 23 of the second display surface 17 respectively. The capacitance may be changed when the distance between the positive electrode and the negative electrode changes. Therefore, when the flexible display screen 10 is bent, the capacitances of the first capacitor 31 and the second capacitor 33 may be changed synchronously, thereby interfering with a judgement of the control module 50.

Referring to FIG. 4, in order to make the first capacitor 31 and the second capacitor 33 not be changed synchronously, in an embodiment, the flexible display screen 10 includes an isolation layer 19. The first capacitor 31 and the second capacitor 33 are disposed on the opposite sides of the isolation layer 19 respectively. The isolation layer 19 is configured to isolate the first capacitor 31 from the second capacitor 33 so as to prevent the capacitance of the first capacitor 31 and the capacitance of the second capacitor 33 from changing synchronously when the flexible display screen 10 is bent or recovered.

Specifically, referring to FIGS. 1-3, in an embodiment, the two first electrodes 311 of the first capacitor 31 are disposed on the left and right ends 23 of the first display surface 15 of the flexible display screen 10 respectively. The two second electrodes 331 of the second capacitor 33 are disposed on the left and right ends 23 of the second display surface 17 of the flexible display screen 10 respectively.

In this way, when the capacitance of the first capacitor 31 reaches the first preset capacitance, the second capacitance 33 may not reach the second preset capacitance, so that the change of the capacitance of the second capacitance 33 may not trigger the control module 50 by mistake, thus enhancing the control reliability.

Referring to FIG. 4, in an embodiment, the isolation layer 19 may be a metal mesh.

In other embodiments, the flexible display screen system may use a control manner different from the above embodiment. For example, in another embodiment, the sensor generates a restoring signal when the flexible display screen is recovered to be in a flat state. The control module is configured to cancel the second display region according to the restoring signal.

In this way, the flexible display screen generates a second display region in a bending state to complete the display process, and the second display region disappears naturally when the flexible display screen is recovered to be in a flat state. Such an operation is more familiar to a user, thus realising a humanization design.

Specifically, in order to realize the control manner of the other embodiments, the first capacitor may be used by the sensor to detect the bending operation. For example, the capacitance of the first capacitor is changed when the flexible display screen is bent. The sensor generates the bending signal when the capacitance of the first capacitor reaches a preset capacitance, and generates a restoring signal when the capacitance of the first capacitor reaches an initial capacitance. The initial capacitance refers to the capacitance of the first capacitor when the flexible display screen is in the flat state.

The display control may be triggered when the flexible display screen 10 is bent to a certain extent according to the preset capacitance, thus avoiding operation errors. Compared with the control manner of the previous embodiments, in the control manner of the other embodiments, only one pair of capacitive electrodes are disposed on one side of the flexible display screen without the isolation layer, thus realising a simple structure and a low cost.

To sum up, with the flexible display screen system 100 described above, the display control of the flexible display screen 10 may be realized by bending the screen, and another display region may be formed so as to provide the content of the original display region to be shared to others. Moreover, the operation is easy and the experience of the user is ensured to be improved. Meanwhile, the above flexible display screen system 100 is suitable for the case that the flexible display screen 10 is a double-sided display screen.

It should be appreciated that, in other embodiments, the manner for sensing the bending direction and bending amplitude of the flexible display screen 10 is not limited to the above-mentioned embodiments in which a capacitor is used, and may be realised different ways. For example, at least one piezoelectric thin film sensor is disposed in the bending direction of the flexible display screen 10, that is, the left-right direction in FIG. 1. The piezoelectric thin film sensor may also sense information such as the bending direction and the bending amplitude of the flexible display screen 10.

Figure 5:
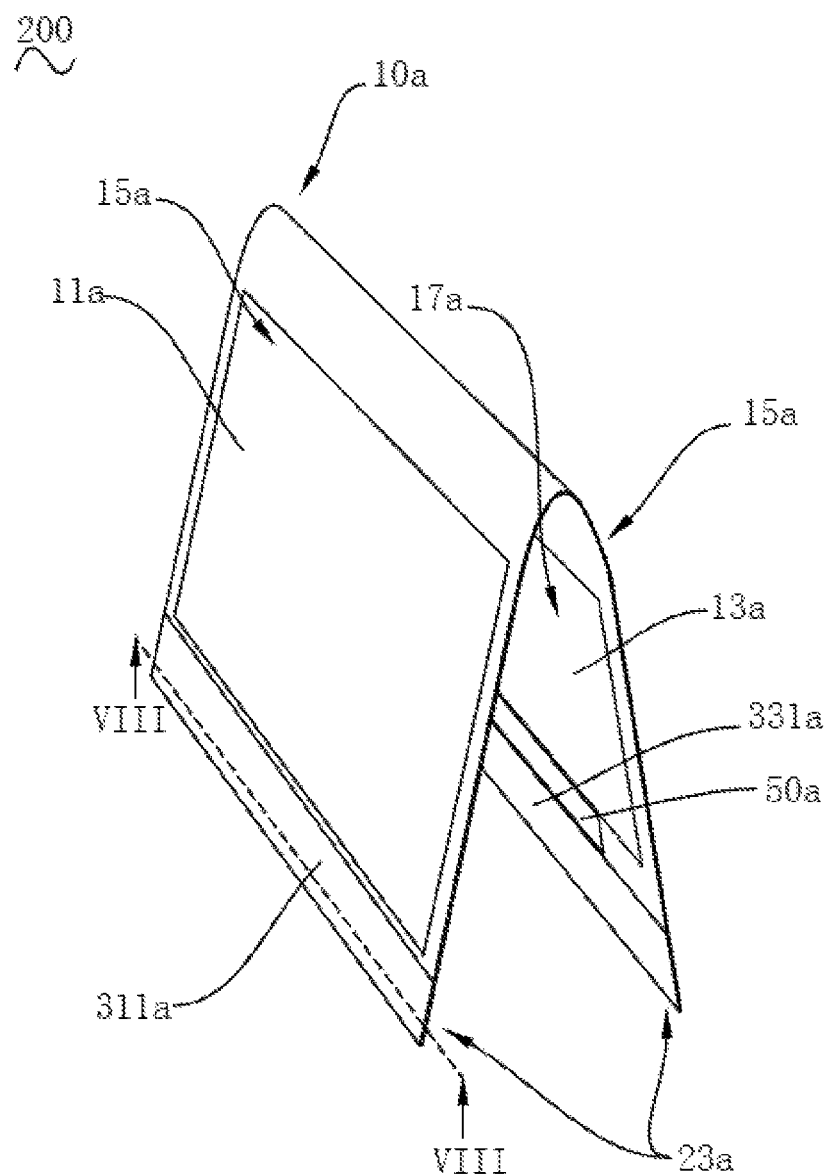
FIG. 5 is a three-dimensional view of a flexible display screen system according to another embodiment of the present disclosure.
Figure 6:
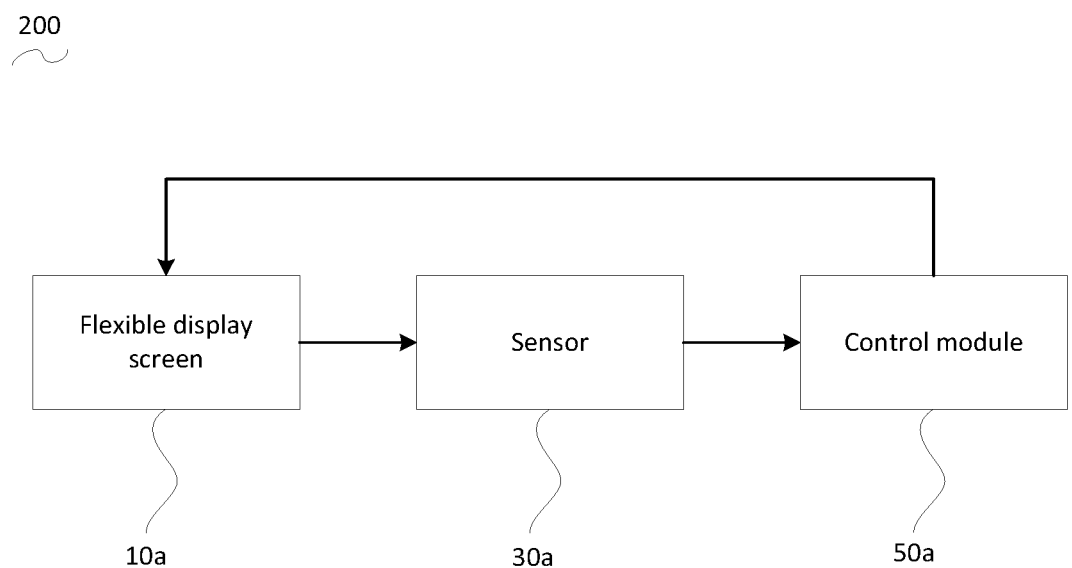
FIG. 6 is a schematic diagram of functional modules in a flexible display screen system according to another embodiment of the present disclosure.

Referring to FIGS. 5 and 6, a flexible display screen system 200 according to another embodiment of the present disclosure includes a flexible display screen 10a, a sensor 30a, and a control module 50a.

The flexible display screen 10a is formed with a first display region 11a. The sensor 30a is configured to generate a bending signal when the flexible display screen 10a is bent. The control module 50a is connected with the flexible display screen 10a and the sensor 30a. The control module 50a is configured to control the flexible display screen 10a to form a second display region 13a according to the bending signal and the display content of the first display region 11a and to control the second display region 13a to display the display content of the first display region 11a.

With the flexible display screen system 200 described above, a display control of the flexible display screen 10a may be realized by bending the screen, and another display region may be formed so as to provide the content of the original display region to be shared to other people. Moreover, the operation is easy and the experience of the user is ensured to be improved.

Specifically, the flexible display screen 10a is a flexible and bendable display device. For example, the flexible display screen 10a can be manufactured by a PHOLED technology. The manufactured flexible display screen 10 has features of low power consumption, bendability and direct visualization.

In the flexible display screen system 200, the flexible display screen 10a includes a display surface 15a, and the first display region 11a and the second display region 13a are formed on the display surface 15a. The control module 50 is configured to control the first display region 11a to form at least two second display regions 13a according to the bending signal.

In other words, in an embodiment, the flexible display screen 10a is a single-sided display screen, and both of the first display region 11a and the second display region 13a are formed on the display surface 15a, and the first display region 11a occupies most part of the display surface 15a, a plurality of second display regions 13a are formed after the first display region 11a disappears.

Referring to FIG. 5, in this way, when two users are facing to each other, the first user may bend the flexible display screen 10a to face to the second user, and the bending operation may provide formation of the second display region 13a, so as to facilitate the other one to watch. In an embodiment of the present disclosure, the control module 50a is configured to control the at least two of the second display regions 13a to simultaneously display the same content, so that the first user may watch the content displaying in the second display region 13a formed by the portion of the display surface 15a facing to himself.

Specifically, referring to FIG. 5, when the flexible display screen 10a is normally used by the first user, it is horizontally arranged and the two ends 23a are held by two hands of the first user. When the first user wants to share the display content to a second user facing to the first user, the flexible display screen 10a is bent at an angle so that a half of the display surface 15a faces to the second user and the other half of the display surface 15a still faces to the first user. During bending, the control module 50a receives the bending signal from the sensor 30a, controls the flexible display screen 10a to form a second display region 13a respectively on the portion of display surface 15a facing to the second user and on the portion of display surface 15a facing the first user, and controls the two second display regions 13a to still display the content previously displayed by the first display region 11a. In this way, the display content is shared to others.

Figure 7:
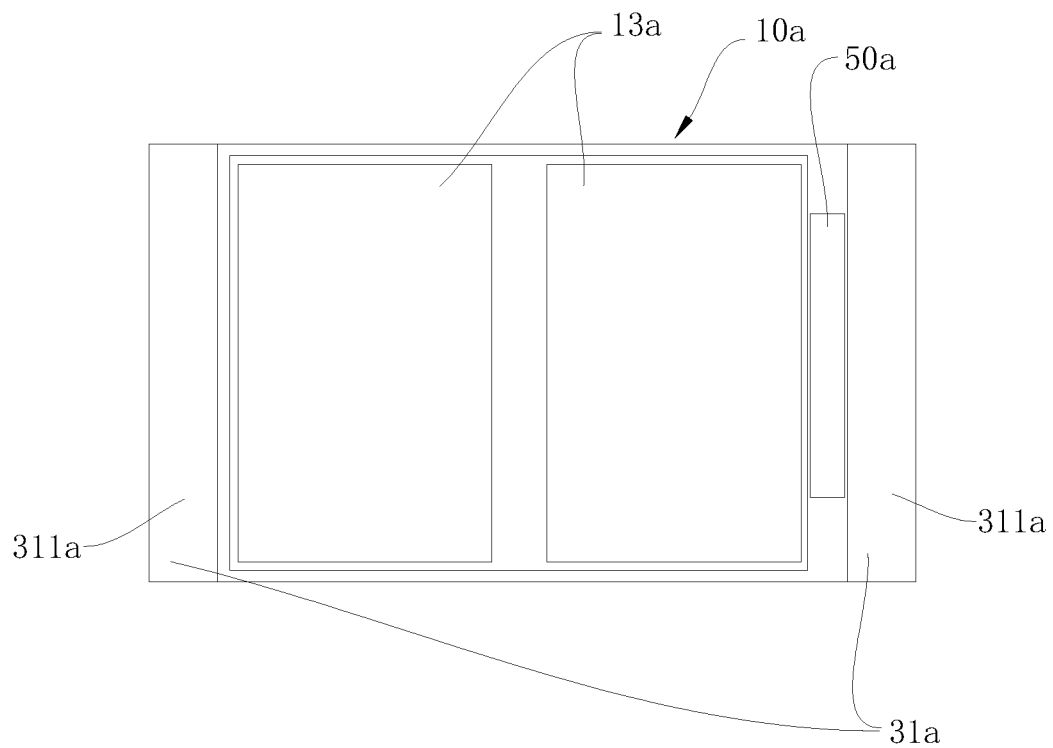
FIG. 7 is a schematic view of a flexible display screen system according to another embodiment of the present disclosure.

In addition, in order to implement the recovery of the first display region 11a, referring to FIGS. 5-7, in an embodiment, the sensor 30a generates the bending signal when the flexible display screen 10a is bent in the first direction, and generates the restoring signal when the flexible display screen 10a is bent in a second direction opposite to the first direction. The control module 50a cancels the second display region 13a according to the restoring signal.

Specifically, in the example shown in FIG. 5, the expression "the flexible display screen 10a is bent in a first direction" may be described for understanding as that the left and right ends 23a of the flexible display screen 10a are moved in a direction of the first display surface 15a and close to the middle of the flexible display screen 10a. Correspondingly, the expression "the flexible display screen 10a is bent in a second direction" may be described for understanding as that the left and right ends 23a of the flexible display screen 10a are moved in a direction of the second display surface 17a and close to the middle of the flexible display screen 10a.

Referring to FIGS. 7 and 5, the advantage of the arrangement in this manner is that a plurality of the second display regions 13a does not disappear after the flexible display screen 10a is restored to be in the flat state. In particular, referring to FIG. 7, in some embodiments in which the number of the second display regions 13a is two, the flexible display screen 10a in the flat state is laid on a table and the first user and the second user may still observe the second display region 13a which is closer to the user to share the display content, especially when the display content is a video or the like that needs to be played for a long time. Such an advantage may make this embodiment convenient and humanized, thus avoiding operation errors. After sharing the display, by bending the flexible display screen 10a reversely, the second display region 13a is disappeared and the first display region 11a is recovered, and the flexible display screen 10a is recovered to the original state.

In order to implement the above control manner of this embodiment, the sensor 30a includes a first capacitor 31a and a second capacitor 33a. A capacitance of the first capacitor 31a is changed when the flexible display screen 10a is bent in the first direction, and a capacitance of the second capacitor 33a is changed when the flexible display 10a is bent in the second direction. The sensor 30a is configured to generate the bending signal when a change in the capacitance of the first capacitor 31a reaches a first preset capacitance, and to generate the restoring signal when a change in the capacitance of the second capacitor 33a reaches a second preset capacitance.

The first capacitor 31a and the second capacitor 33a are set for determining a direction for bending the flexible display screen 10a, and the display control may be triggered when the flexible display screen 10a is bent to a certain extent according to preset capacitances, thus avoiding operation errors.

In an embodiment, two first electrodes 311a of the first capacitor 31a are disposed on two ends 23a of the first display surface 15a respectively, and two second electrodes 331a of the second capacitor 33a are disposed on two ends 23a of the second display surface 17a opposite to the first display surface 15a respectively. The capacitance may be changed when the distance between the positive electrode and the negative electrode of the capacitor changes. Therefore, when the flexible display screen 10a is bent, the capacitances of the first capacitor 31a and the second capacitor 33a may be changed synchronously, thereby interfering with a judgement of the control module 50a.

Figure 8:
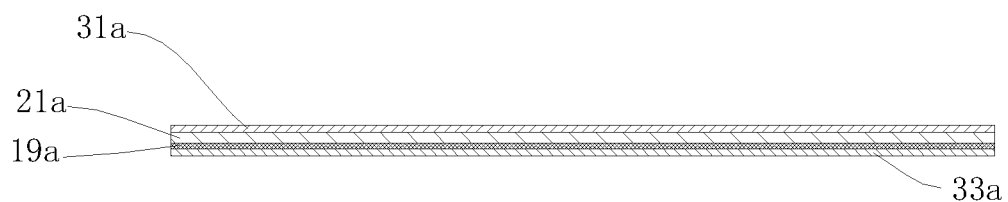
FIG. 8 is a sectional view of the flexible display screen system of FIG. 5 in a direction of line VIII-VIII.

Referring to FIGS. 8 and 5, in order to make the first capacitor 31a and the second capacitor 33a not be changed synchronously, in another embodiment, the flexible display screen 10a includes an isolation layer 19a. The first capacitor 31a and the second capacitor 33a are disposed on the opposite sides of the isolation layer 19a respectively. The isolation layer 19a is configured to isolate the first capacitor 31a from the second capacitor 33a so as to prevent the capacitance of the first capacitor 31a and the capacitance of the second capacitor 33a from changing synchronously when the flexible display screen 10a is bent or recovered. In addition to the isolation layer 19a, the first capacitor 31a and the second capacitor 33a, the flexible display screen 10a further includes a display layer 21a for display under the control of the control module 50a.

Specifically, referring to FIGS. 5-7, in an embodiment, the two first electrodes 311a of the first capacitor 31a are disposed on the left and right ends 23a of the first display surface 15a of the flexible display screen 10a respectively. The two second electrodes 331a of the second capacitor 33a are disposed on the left and right ends 23a of the second display surface 17a of the flexible display screen 10a respectively.

In this way, when the capacitance of the first capacitor 31a reaches the first preset capacitance, the second capacitance 33a may not reach the second preset capacitance, so that the change of the capacitance of the second capacitance 33a may not trigger the control module 50a by mistake, thus enhancing the control reliability. The isolation layer 19a may be a metal mesh.

In other embodiments, the flexible display screen system may use a control manner different from the above embodiment, for example, the sensor generates a restoring signal when the flexible display screen is recovered to be in the flat state. The control module is configured to cancel the second display region, recover the first display region and control the first display region to display the display content of the second display region according to the restoring signal.

In this way, after the flexible display screen is bent and the display is finished, once the flexible display screen is recovered to be in the flat state, the second display region is canceled and the first display region is recovered, and the flexible display screen is recovered to be an original state before bending. When the user does not need to content on display for a long time, such an operation is more familiar to a user, and a convenient and humanization design is achieved.

Specifically, in order to realize the control manner of the other embodiments, the first capacitor may be used by the sensor to detect the bending operation. For example, the capacitance of the first capacitor is changed when the flexible display screen is bent. The sensor generates the bending signal when the capacitance of the first capacitor reaches a preset capacitance, and generates a restoring signal when the capacitance of the first capacitor reaches an initial capacitance. The initial capacitance refers to the capacitance of the first capacitor when the flexible display screen is in the flat state.

The display control may be triggered when the flexible display screen 10 is bent to a certain extent according to the preset capacitance, thus avoiding operation errors. Compared with the control manner of the previous embodiments, in the control manner of the other embodiments, only one pair of capacitive electrodes are disposed on one side of the flexible display screen without the isolation layer, thus realising a simple structure and a low cost.

To sum up, with the flexible display screen system 200 described above, the display control of the flexible display screen 10a may be realized by bending the screen, and another display region may be formed so as to provide the content of the original display region to be shared to others. Moreover, the operation is easy and the experience of the user is ensured to be improved. Meanwhile, the above flexible display screen system 200 is suitable for the case that the flexible display screen 10a is a double-sided display screen.

In addition, in some embodiments, the flexible display screen includes a flexible touch screen configured to receive inputting signals from the flexible touch screen. In an embodiment of the present disclosure, an operation of the touch screen may be performed in the first display region and the second display region to control the flexible display screen.

In this way, both of the users i.e., a first user and a second user facing to the first user, may perform the operation of the touch screen, so that with the flexible display screen according to embodiments of the present disclosure, not only the sharing of the display content is realised, but also the sharing of the control is realised.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that the order of execution may differ from that which is depicted. Moreover the scope of the preferred embodiments of the disclosure includes additional implementations in which the functions may be performed in the orders not shown or discussed, including a substantially simultaneous or a reverse order according to the involved functions, which should be understood by those skilled in the art which the embodiment of the present disclosure is belonged to.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. More specific examples (not a non-exhaustive list) of computer readable media include as follows: electrical connections (electronic devices) having one or more wires, portable computer disk cartridges (magnetic device), random access memories (RAM), read only memories (ROM), erasable programmable read only memories (EPROM or flash memory), optical fiber devices, and compact disc read only memories (CDROM). In addition, the computer-readable medium can even be paper or other suitable mediums upon which the program can be printed as it can be read, for example, by optical scanning for the paper or other mediums, followed by editing, interpreting or, where appropriate, processing to electronically obtain the program, which is then stored in a computer memory.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware, like the another embodiment, it may be implemented by using any one or a combination of the following techniques well known in the art: a discrete logic circuit having a logic gate circuit configured to implement logic functions on data signals, application-specific integrated circuits having suitable combination of logic gate circuit, programmable gate arrays (PGA), field programmable gate arrays (FPGA), and the like.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A flexible display screen system, comprising:
a flexible display screen formed with a first display region;
a sensor configured to generate a bending signal when the flexible display screen is bent;
a processor connected with the flexible display screen and the sensor, wherein the processor is configured to control the flexible display screen to form a second display region according to the bending signal and a display content of the first display region and to control the second display region to display the display content of the first display region,
wherein the flexible display screen is a doubled-sided display screen comprising a first display surface and a second display surface opposite to each other, the first display region being formed on the first display surface, and the second display region being formed on the second display surface,
the sensor is configured to generate the bending signal when the flexible display screen is bent in a first direction, and to generate a restoring signal when the flexible display screen is bent in a second direction opposite to the first direction; and the processor is configured to cancel the second display region according to the restoring signal;
the sensor comprises a first capacitor and a second capacitor, a capacitance of the first capacitor is changed when the flexible display screen is bent in the first direction, a capacitance of the second capacitor is changed when the flexible display screen is bent in the second direction, wherein the sensor is configured to generate the bending signal when a change in the capacitance of the first capacitor reaches a first preset capacitance, and to generate the restoring signal when a change in the capacitance of the second capacitor reaches a second preset capacitance; and two first electrodes of the first capacitor are disposed on two ends of the first display surface respectively, and two second electrodes of the second capacitor are disposed on two ends of the second display surface respectively.

2. The flexible display screen system of claim 1, wherein the sensor is configured to generate the restoring signal when the flexible display screen is recovered to a flat state, and the processor is configured to cancel the second display region according to the restoring signal.

3. The flexible display screen system of claim 1, wherein the flexible display screen comprises an isolation layer, the first capacitor and the second capacitor are disposed at two opposite sides of the isolation layer respectively, and the isolation layer is configured to isolate the first capacitor from the second capacitor so as to prevent the capacitance of the first capacitor and the capacitance of the second capacitor from changing synchronously when the flexible display screen is bent or recovered.

4. The flexible display screen system of claim 1, wherein the processor is configured to control the first display region and the second display region to simultaneously display a same content.

5. The flexible display screen system of claim 1, wherein the flexible display screen is a flexible touch screen configured to receive an input signal from the flexible touch screen.

6. A flexible display screen system, comprising:
a flexible display screen formed with a first display region;
a sensor including a first capacitor and a second capacitor and configured to generate a bending signal when the flexible display screen is bent; and
a processor connected with the flexible display screen and the sensor, wherein the processor is configured to control the flexible display screen to form at least two second display regions according to the bending signal and a display content of the first display region and to control the at least two second display regions to display the display content of the first display region,
wherein the flexible display screen comprises a first display surface and a second display surface opposite to each other; the first display region and the at least two second display regions are formed on the first display surface; the processor is configured to control the first display region to form the at least two second display regions according to the bending signal; the flexible display screen comprises an isolation layer, the first capacitor and the second capacitor are disposed at two opposite faces of the isolation layer respectively, the first capacitor, the isolation layer, and the second capacitor forming a sandwich structure; and two first electrodes of the first capacitor are disposed on two ends of the first display surface respectively, and two second electrodes of the second capacitor are disposed on two ends of the second display surface respectively.

7. The flexible display screen system of claim 6, wherein the sensor is configured to generate a restoring signal when the flexible display screen is recovered to a flat state; and the processor is configured to cancel the at least two second display regions and restore the first display region according to the restoring signal and control the first display region to display the display content.

8. The flexible display screen system of claim 6, wherein the sensor is configured to generate the bending signal when the flexible display screen is bent in a first direction, and configured to generate a restoring signal when the flexible display screen is bent in a second direction opposite to the first direction;
the processor is configured to cancel the at least two second display regions and restore the first display region according to the restoring signal and control the first display region to display the display content of the at least two second display region.

9. The flexible display screen system of claim 8, wherein a capacitance of the first capacitor is changed when the flexible display screen is bent in the first direction, a capacitance of the second capacitor is changed when the flexible display is bent in the second direction;
the sensor is configured to generate the bending signal when a change in the capacitance of the first capacitor reaches a first preset capacitance, and to generate the restoring signal when a change in the capacitance of the second capacitor reaches a second preset capacitance.

10. The flexible display screen system of claim 9, wherein the isolation layer is configured to isolate the first capacitor from the second capacitor so as to prevent the capacitance of the first capacitor and the capacitance of the second capacitor from changing synchronously when the flexible display screen is bent or recovered.

11. The flexible display screen system of claim 6, wherein the processor is configured to control the at least two second display regions to simultaneously display a same content.

* * * * *